（12） United States Patent
Hillyer et al.

(10) Patent No.: US 6,317,499 B1
(45) Date of Patent: Nov. 13, 2001

(54) STORAGE DEVICE RANDOM BIT GENERATOR

(75) Inventors: Bruce Kenneth Hillyer, Lebanon; Bjorn Markus Jakobsson, Hoboken; Elizabeth Shriver, Jersey City, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/127,821

(22) Filed: Aug. 3, 1998

(51) Int. Cl.[7] .................................................. H04K 1/00

(52) U.S. Cl. ............................................ 380/59; 380/277

(58) Field of Search ............................. 708/255; 380/59, 380/277

(56) References Cited

PUBLICATIONS

Davis et al, "Cryptographic Randomness from Air Turbulence in Disk Drives", CRYPTO '94, Springer, 1994.*
Eastlake et al, "Randomness Recommendations for Security (rfc 1750)", Network Working Group, 1994.*

* cited by examiner

Primary Examiner—Thomas R. Peeso
(74) Attorney, Agent, or Firm—William H. Bollman

(57) ABSTRACT

The present invention is an apparatus for generating random bits from a computer system. The apparatus comprises a rotating storage device operating within the computer system. A rotational latency of the rotating storage device is associated with the computer system accessing information from the storage device with the rotational latency causing the accessing of the information to have an entropy. An extraction mechanism extracts random bits derived from entropy of the rotational latency of the storage device.

27 Claims, 2 Drawing Sheets

FIG. 2

| destination address | mean response time | entropy | rotational latency entropy |
|---|---|---|---|
| 802816 | 7.50 ms | 3.17 | 0.16 |
| 808448 | 2.15 ms | 3.01 | - |
| 1080329 | 7.61 ms | 3.08 | 0.11 |
| 1081344 | 1.76 ms | 2.97 | - |
| 105387008 | 9.50 ms | 3.17 | 0.13 |
| 105401344 | 4.43 ms | 3.04 | - |
| 1048622592 | 12.95 ms | 3.13 | 0.13 |
| 1048623104 | 7.16 ms | 3.00 | - |
| 1050628096 | 12.99 ms | 3.10 | 0.10 |
| 1050628608 | 7.03 ms | 3.00 | - |

STORAGE DEVICE RANDOM BIT GENERATOR

BACKGROUND OF THE INVENTION

1. Field of the Invention

This invention relates generally to a secure physical random bit generator apparatus and method for generating random bits and, more particularly, it relates to a secure physical random bit generator apparatus and method for generating random bits using computer storage devices as a source of randomness.

2. Background of Related Art

As one of many uses, randomness and randomness generation are a central aspect of cryptography. In cryptography, randomness is paramount for key randomness generation, is necessary in many encryption algorithms and interactive proofs, and useful for boosting the efficiency of algorithms. Randomness is the pillar on which anonymity rests, and protocol soundness often requires access to a source of random bits.

It has been proven that if a one-way function exists, then, given a random seed, it is possible to generate more randomness (a polynomial amount in the length of the seed). A function that amplifies randomness in this manner is called a pseudo-random generator. It is also known that if the underlying hardness assumption holds (i.e., that a particular function cannot be inverted in polynomial time in the length of its security parameter) then it is impossible to predict the next bit to be output by the pseudo-random generator with a probability non-negligibly better than ½.

It should be noted that the ability to predict the next output bit holds only if the seed is unknown to the adversary. Therefore, randomness (in the form of the short seed) is necessary in order to produce more randomness.

In commercial cryptographic packages, the seed is generally supplied by the user. One approach for use by the user is to base the seed on timing information between key strokes during a period of several minutes during which the user "bangs the keyboard". Allegedly, this produces a random seed, but is rather inconvenient to the user. Thus, more automated methods have been suggested based on physical phenomena having a large portion of unpredictability.

For instance, one such method uses the time between observed emissions from a radioactive material. Another method measures the frequency instability of an oscillator. Both of these methods require the introduction of new devices, i.e., the radioactive material and the noisy transistor, respectively, and the measuring mechanisms to observe these devices. Other methods include the quantum-mechanical noise in transistors and lava lamp blobs. Needless to say, additional devices and mechanisms increase costs and new potential weaknesses, particularly if the device or meter stops working as designed.

Accordingly, there exists a need for a secure physical random bit generator apparatus and method for generating random bits which does not require user involvement, is not predictable, and is not manipulatable. Additionally, a need exists for a secure physical random bit generator apparatus and method for generating random bits which does not require any new equipment or any modifications to a computer'operating system. Furthermore, there exists a need for a secure physical random bit generator apparatus and method for generating random bits which allows the user to easily determine whether the generator is functioning correctly. Further yet, a need exists for a secure physical random bit generator apparatus and method for generating random bits which is based on a well-studied physical phenomenon thereby establishing an assurance of the level of randomness for the user.

SUMMARY OF THE INVENTION

The present invention is an apparatus for generating random bits from a computer system. The apparatus comprises a rotating storage device operating within a computer system. A rotational latency of the rotating storage device is associated with the computer system accessing information from the storage device with the rotational latency causing the accessing of the information to have an entropy. An extractor extracts random bits derived from entropy of the rotational latency of the storage device.

The present invention is further an apparatus for generating random bits from a computer system. The computer system has hardware components and software components communicating in an input/output (I/O) circuit path. The apparatus comprises a storage device operating within the computer system with the storage device responding to access requests from the hardware components and the software components at random rates. An extractor extracts random bits derived from the variance of the storage device response times from the hardware components and the software components.

The present invention additionally includes a method for deriving random bits from a computer system with the computer system having hardware components and software components in an I/O path. The method comprises providing an operating storage device within the computer system, measuring the time required by the storage device to respond to a access request, and deriving the random bit output from the measurements.

BRIEF DESCRIPTION OF THE DRAWINGS

Features and advantages of the present invention will become apparent to those skilled in the art from the following description with reference to the drawings, in which:

FIG. 2 is a table illustrating sample mean response times and sample entropy of access times computed in accordance with a secure physical random bit generator apparatus and method for generating random bits in accordance with the principles of the present invention.

DETAILED DESCRIPTION OF ILLUSTRATIVE EMBODIMENTS

Figure 1:
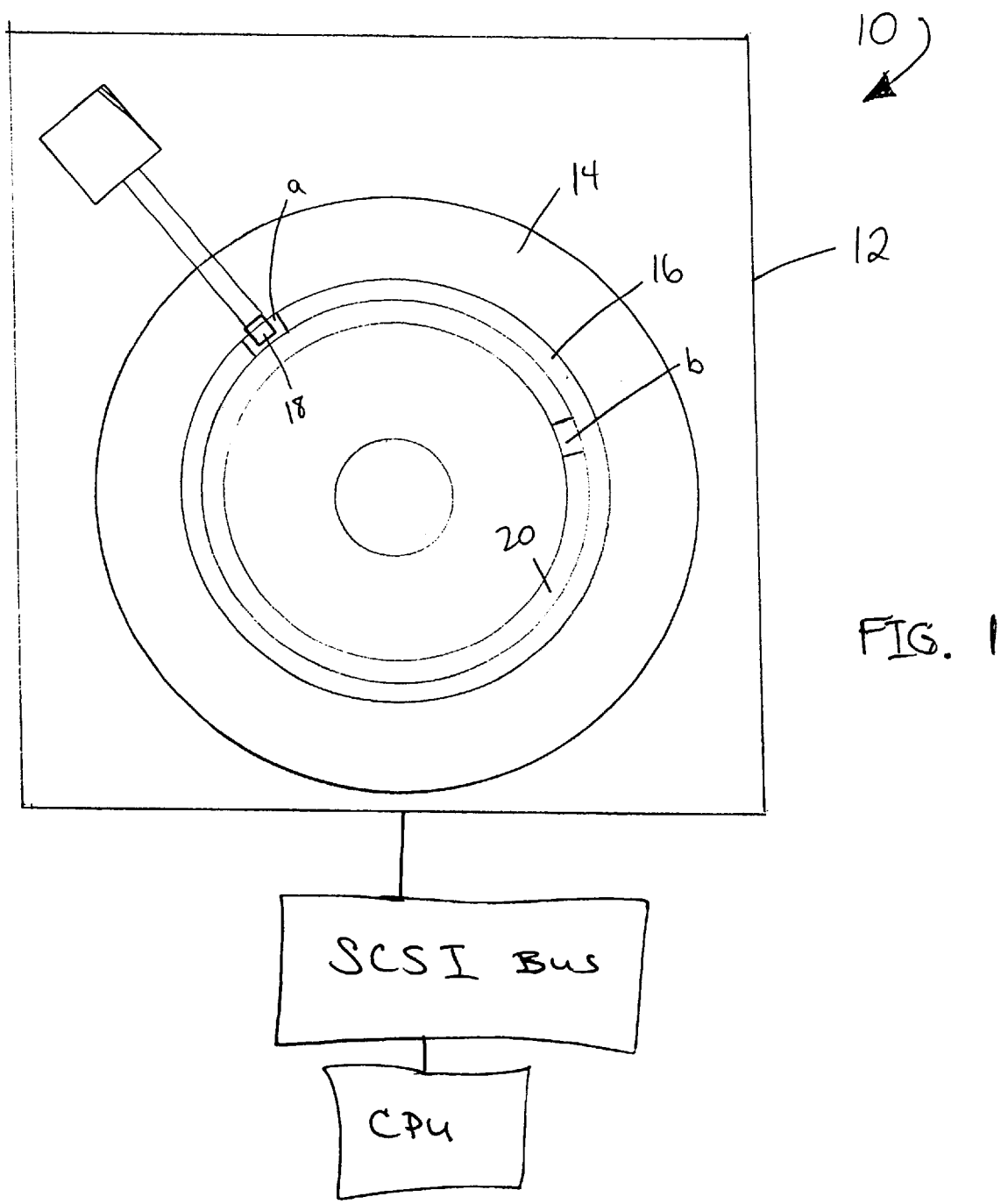
FIG. 1 is a top view illustrating a disk drive of a secure physical random bit generator and method for generating random bits constructed in accordance with the principles of the present invention.

Given the timings of any periodic or sporadic event in a computer system, such that these timings exhibit a known amount of uncertainty, the present invention provides apparatus and a method for generating random bits from the timings. The uncertainty is generally based on an amount of entropy greater than an epsilon.

The disclosed embodiment describes a secure, physical random bit generator apparatus and a method for generating random bits and deriving randomness from measurements of access or response times of a storage device. Example storage devices include, e.g., computer tape drives, computer CD-ROMs, and computer disk drives. The principles of the present invention relate equally to other computer phenomena that exhibit a known degree of unpredictability.

FIG. 1 shows an exemplary physical random bit generator apparatus 10 comprising a computer disk drive 12. The randomness of the random bit generator apparatus 10 is based on variations in response times of the computer disk drive 12.

Computer disk drives 12 are already included in most computer systems. Thus, there is no additional requirement for any new equipment or any modifications to a computer'operating system in order to add a random bit generator in accordance with the principles of the present invention. Furthermore, the user of the computer system, at most times, is generally aware whether the computer system'disk drive 12 is operational or incapacitated. Moreover, the input/output (I/O) response time between the processor and the disk drive 12 has a random component thereby establishing an assurance of randomness for the user.

In the present embodiment, two different modes of operation exist for the random bit generator apparatus. The first mode, called the "paranoid" mode, extracts random bits derived from the entropy of the rotational latency of a disk 14 read within a disk drive 12. The entropy of the rotational latency is a consequence of chaotic air turbulence caused by the rotating disk within the disk drive 12. Therefore, due to the entropy caused by the chaotic air turbulence, random bits are unpredictably derived from the rotational latency of the disk 14.

From measurements determining a lower bound on the amount of entropy attributable to rotational latency, a conservative measure of the number of readings required to produce one output bit, given a specified maximum failure rate (i.e. the maximum probability of success of an adversary who is trying to guess the next output bit), can be calculated. For instance, for a failure rate of one in $2^{80}$ (i.e., failure $2^{-80}$) corresponding to the maximum possible probability of guessing the output bit, the computer configuration in the paranoid mode produces one random bit for every fifteen hundred (1500) readings, i.e., approximately five (5) bits per minute in one hardware embodiment.

The second mode of operation for the random bit generator apparatus of the present invention, called the "utility" mode, derives randomness from a variance in the disk access time which, in turn, is derived from the communication between the hardware and software components in the I/O circuit path of the computer system. Although the hardware and software components within a computer system are deterministic, in theory, the complexity of the hardware and software components and the interactions between the hardware and software components renders the communications between the hardware components and the software components effectively non-deterministic. Therefore, from a practical standpoint, a perfect model of the computer system, and the communication between the hardware components and the software components therein, is intractable or hard to manage thereby increasing the assurance of randomness from the variance of disk access time derived from the communication between the hardware and software components.

In the disclosed embodiment, for the utility mode and the certain parameters of specific hardware components within the computer system, to obtain a failure rate of $2^{-80}$, thirteen (13) readings per output bit are required producing approximately five hundred and thirty-five (535) random bits per minute. In fact, the output of the utility mode is virtually indistinguishable from a truly random sequence. The results from the utility mode also imply the soundness of the random bit generator apparatus in the paranoid mode since the implementation of both the paranoid mode and the utility mode is identical except for the number of readings actually combined to produce each random output bit.

The present invention further comprises a process to measure the response time for certain I/O circuit path requests and to derive the random output from the response time measurements of the requests. The software implementing the process determines an appropriate sequence of disk addresses to access within the disk drive 12, measures the amount of available entropy of the desired type (i.e., derived only from rotational latency, or derived from all sources) and calculates how many measurements are needed per output bit to meet any specified error rate given the available entropy. Then, the process repeatedly measures the access times for the determined disk addresses, and extracts random bits from these measurements.

In the secure physical random bit generator apparatus and method of the present invention, the time required to respond to a read request from a magnetic disk in a computer disk drive 12 is used as the random parameter. For purposes of the present invention, the Applicants used a Seagate Cheetah ST-34501W disk drive connected to a Sun Ultra-1 computer system running the Solaris 2.6 operating system. The measurements used the high-resolution timing capability that is generally available in workstations and PCs. In the Solaris 2.6 computer program, the timing capability is provided by a 'gethrtime ( )' library function having a 0.6 microsecond resolution on the Sun Ultra-1 computer system.

The performance of a disk drive 12 operating within a computer system has been well-studied and methods currently used to predict disk performance include analytic modeling and simulation. Both of the methods are ultimately parameterized by measurements obtained from real disks. Using any of these methods, the time needed to read a block from a local disk drive 12 is an event that currently cannot be predicted with great accuracy because of the complexity of the operating system and of the I/O circuit path. The best models of the prior art have unacceptable errors of at least a few percent in predicting the mean service time. In fact, the service times are known to have a large variance, even for repetitive measurements of the same pattern of reads on the same computer system and the disk drive 12.

The secure physical random bit generator apparatus and method of the present invention extracts random bits from the inherently unpredictable component of disk drive access times. A difference between the paranoid mode and the utility mode of the present invention is the number of readings that are required to produce one output random bit. Several minor efficiency enhancements and implementation variants are possible, but for purposes of discussion, only the basic algorithm will be discussed.

The disclosed method comprises three (3) steps, i.e., a calibrating step (i.e., discover how much randomness is available), a querying step (i.e., collect timings), and a filtering step (i.e., reduce the timings to output bits, for example, by exclusive ORing together the bits of the timings).

The calibrating step measures properties of the particular computer system and the disk drive 12 that will serve as a source of randomness, identifying an advantageous set of disk addresses to use as targets of read commands, and calculating a safe bound on the amount of entropy available for use. The querying step performs a large number of read operations measuring the raw service times from which the random bits will be derived. The filtering step applies a filtering function to the sequence of raw service times producing a sequence of random bits for output. The calibrating step, the querying step, and the filtering step will each be described in more detail.

The calibrating step of the secure physical random bit generator apparatus and method for generating random bits in the disclosed embodiment includes three (3) stages. In the first stage, an advantageous sequence of disk addresses to use for timing measurements is determined. In the second stage, the amount of entropy per disk timing that can be safely extracted is calculated. Finally, in the third stage, the number of raw service times to be grouped during the filtering stage is determined.

The random generator measures the service times for single-sector reads from a sequence $r_1 \ldots, r_n$ of disk addresses. Any value of n>2 can be used provided that n is greater than the number of sequential streams that can be held in the disk drive'cache.

It is desirable that the response time for each address contain a full disk rotation so that the response time includes the entropy derived from the rotational latency of the disk 14. To determine disk addresses derived from a full rotational latency, a block of data from address a on a first track 16 is read, then a read from address b on a different track 20 is immediately requested and the disk drive head 18 is moved to a different track 20 on the same disk 14. While the disk drive head 18 is moving, the disk 14 normally rotates. When the disk drive head 18 arrives at the different or destination track 20, the location of address b is determined relative to the disk drive head 18. In one extreme case, address b can be just rotating under the disk drive head 18 so that the address b is actually immediately readable. In such case, the service time will consist of overhead plus seek time but no rotational latency time. In the other extreme case, address b has rotated just past the disk drive head 18 as the head 18 arrives at the different or destination track 20 causing the service time to consist of overhead plus seek time plus time for a full rotational latency.

Therefore, given an address a, a pair of addresses b and b+δ is searched such that the service time for address b+δ is less than the service time for address b by about the time of one disk rotation. Address a plus twice the average capacity of a disk cylinder which can be obtained from the disk manufacturer'specification sheet equals the initial value of b. A linear search is performed in which address b is incremented by moderate amounts, i.e., 20% of the size of a disk track as obtained from the disk manufacturer'specification sheet, observing a smooth monotonic increase in timings, until a pair b' and b" such that the time for b" is less than the time for b' by a large fraction of the rotational latency time (also obtained from the disk manufacturer'specification sheet). The pair of destinations b' and b" bracket the desired address b that maximizes the rotational latency. A binary search finds that address b.

Therefore, to obtain the sequence of $r_i$, an arbitrary address $r_1$ is chosen as a starting point, and using this arbitrary address as address a, a search is conducted for an acceptable address b relative to address a, i.e., a value for address b incurring a large rotational latency. For purposes of the present invention, address b is $r_2$. The search process is iterated to find an acceptable $r_i$ relative to each $r_{i-1}$.

In the utility mode, the amount of randomness available for extraction is bound by the full entropy of the response time of a request with a full rotation. The entropy of a response time of a faster access such as a cache hit could also be computed. While producing the random bits at a faster rate, the entropy could not be attributed to an inherently unpredictable source such as chaotic variation in rotational latency. Since the same type of accesses are used for both the paranoid mode and the utility mode, the results confirming the validity of bits from the latter mode automatically confirm the validity of the bits from the former mode.

Sample values of entropy are given in FIG. 2, which shows the entropy computed using the equation on line 30 below for 10 destination addresses on the computer system. A hundred (100) single-sector reads for pairs of addresses a, b were performed. The first column is the value b while a=524288. To compute the entropy, the response times, $t_i$, for i=100 iterations of the request from a to b were measured. By quantizing (i.e., rounding-off) the response times $t_i$, into buckets (equivalence classes of timings), the rounded response times $q_i$ were obtained from which the entropy was computed by computing the frequency for each $q_i$ and the standard definition of entropy:

$$E = -\Sigma f(k) \log_2 f(k),$$

where f(k) represents the frequency of a value k.

Next, the response times are rounded by varying the quantization to find the bucket size producing the maximum value of $E_i$. Intuitively, if all the readings fall into one bucket only (which is a very drastic rounding-off), there is only one outcome of the experiment, and the entropy of the experiment is zero. Similarly, for the same number of buckets as readings, the difference between the entropy of the two experiments for the paranoid mode will also be zero. However, choosing an intermediate bucket size will give a positive difference of entropy. From a reasonable number of measurements for various bucket sizes, the bucket size that maximizes the perceived difference in entropy between related experiments is selected. Generally, this is a lower bound for the actual entropy of the data from rotational latency.

Not all of the measured entropy is guaranteed to correspond to actual unpredictable random bits. Therefore, in the paranoid mode, only random bits are extracted whose entropy derives from the inherently unpredictable variation in rotational latency that is caused by chaotic air turbulence. These random bits are a priori unpredictable by a strong adversary.

In the paranoid mode, the entropy of the timings with destination b are calculated, Also, the entropy of the timings with destination b+δ. The difference between these entropies is attributed to rotational latency. The incremental amount of entropy is used to bound the amount of randomness available for extraction.

The entropy attributed to rotational latency is illustrated in the last column of FIG. 2. The table in FIG. 2 shows pairs of destination addresses, the b and b+δ, that incur full rotational latency and no rotational latency, respectively. On average, in the particular hardware embodiment disclosed in the present application, the destinations that include a full rotational latency have an entropy value that is higher by a factor of 0.126.

Specific to the disclosed hardware embodiment, for the paranoid mode, the available entropy is determined by computing the entropy $E_{ri}$, where $r_i+\delta$ is the destination near $r_i$ that had no rotational latency. The entropy attributable to rotational latency is then calculated, namely $E_i = E_{ri} - E_{r1+\delta}$ (i∈+1 ... n−1).

Given the lower bound on entropy attributable to rotational latency, the final step in the calibration phase is to determine k, the number of readings required to compute one output bit. The entropy of a bit is calculated as $$E = -p \log_2 p - (1-p) \log_2(1-p)$$

where p is the probability of the bit being 0. If a bit contains less than one bit of entropy, this corresponds to a bias, i.e., one of the outcomes is more likely. The bit probabilities that correspond with the measured entropy are first calculated, e.g., the entropy illustrated in FIG. 2. It is then determined how many of the biased bits need to be exclusive-ORed together to drive the bias of the resulting bit below any specified threshold.

Consider two readings, each consisting of a single bit that takes the value zero with probabilities $p_1 = \frac{1}{2} + \epsilon_1$ and $p_2 = \frac{1}{2} + \epsilon_2$, respectively. By exclusive-ORing these bits, the result is zero with probability $p_i \, p_2 + (1-p_1)(1-p_2) = \frac{1}{2} + 2\epsilon_1 \epsilon_2$. Generalizing this result, the bias can be computed after exclusive-ORing k such bits as $$\epsilon' = 2^{k-1} \prod_{j=1}^{k} \epsilon_i$$

Given that each offset $\epsilon_i$ is never larger than ½, for all values of i, the equation must go towards zero for increasing values of k. The value $\epsilon$ is chosen as the average offset given an entropy computed over a sequence of 1000 readings. Therefore, by setting $\epsilon_i = \epsilon$ for all i, the following is achieved $$\epsilon^i = 2^{k-1} \epsilon^k.$$

To solve the equation for k with a maximum failure rate of $2^{-80}$, $\epsilon^i = 2^{-80}$, the terms are rearranged, getting $$k = \frac{-79}{1 - \log_2 \epsilon}.$$

As an example for the paranoid mode, assuming n=2, $r_1 = 524288$, and $r_2 = 105387008$, from the 4th column of the table of FIG. 2, E=0.13. Using the entropy equation, p is approximated as 0.982, hence $\epsilon = 0.482$ (since $p = \frac{1}{2} + \epsilon$). Substituting the value of $\epsilon$ into the above equation, k=1494. The derivation shows that if fifteen hundred (1500) readings are "collapsed" to a single bit, and the entropy per reading is 0.13, then the output will have a bias that is upper-bounded by $2^{-80}$.

In the utility mode, we obtain k from the entropy derived from additional elements of the computer I/O architecture, and thereby obtain significantly more efficient results. Although tests show a total entropy of approximately three (3) bits of entropy per reading (see the 3rd column of the table of FIG. 2), the entropy is not concentrated in three bits only, but spread over all of the bits of the response time. Note also that these bits are correlated to each other, and so, cannot be treated as individual readings.

Consequently, for utility mode we determine k directly from the bias $\epsilon$ as follows. First, we exclusive-OR all the bits of a reading to obtain a single bit reduced reading. Then, we count the number of 0 bits and 1 bits in the set of reduced readings to determine the bit probabilities (p is the ratio of 0 bits to total bits). This leads directly to k from the equation since $p = \frac{1}{2} + \epsilon$. We computed $\epsilon = 0.007$ for 1000 readings using addresses similar to row 5 in FIG. 2. From the equation we get k=12.83, which we round to 13. Using the equation, we see that this value of p corresponds with an entropy of about 1, which is conservative by comparison with the total entropy in the 3rd column of FIG. 2.

It should be noted that the chosen value k guarantees the randomness of the output, assuming the correctness of the entropy estimation, since it puts an upper-bound on the bias of the output bits. Implicitly, a proper choice of k therefore corresponds to a proof that the generator outputs random bits, given statistically significant estimations of the entropy.

After the three calibration steps are completed, the querying step collects the raw data from which random bits are generated. The sequence $\{r_i\}$ of single-sector read requests determined during calibration are repeatedly issued to obtain a sequence of corresponding service times $t_i$. The measurements are preceded by a set f of requests (not near the $r_i$) that flush the disk cache, so that the disk will be forced to serve all of the $r_i$ from the disk surface. Thus, the pattern of read requests iterates over the addresses f, $r_1, \ldots, r_n, r_1, \ldots, r_n, \ldots$.

During the filtering step, random bits from the timings $t_i$ are extracted. The filtering step groups the readings $t_i$ into contiguous batches of size k, and reduces each batch to a single bit by, e.g., calculating the exclusive-OR of all the bits in all the $t_i$ in the batch. An exclusive-OR is only one particular implementation; other functions are possible and within the scope of the present invention. This is one example of a filter function. For purposes of the present application, k is the value calculated from the entropy during calibration, namely one thousand, five hundred (1500) for the paranoid mode and thirteen (13) in the utility mode for the particular computer configuration set forth above.

The random bit generator of the present invention generates random bits derived from the entropy present in measurements of the disk I/O circuit path service time in a computer. The random bit generator does not require any addition or changes of hardware. The random bit generator has two modes, a paranoid mode and a utility mode. In the paranoid mode, the random bits are generated from a source with known chaotic behavior and are known to be unpredictable. In the utility mode, random bits are generated from a source that is deterministic from an epistemological point of view, but that, in practice, is acknowledged to be predictable only to a limited degree. The paranoid mode is appropriate for generation of secret keys, seeds for pseudorandom generators, or wherever required that the bit string be perfectly random against the strongest possible adversary. The utility mode is appropriate for applications which require cryptographically strong bits in the absence of a strong adversary, for settings where the power of the adversary is known not to be sufficient, or where the cost to attack the system with a reasonable success probability greatly exceeds the potential gain of a successful attack.

The fundamental requirement for a random generator is that the generator be random such that an adversary cannot predict the output of the generator. It is also desirable to be able to verify the result practically by presenting empirical evidence that the generated bits are statistically indistinguishable from truly random bits. A person skilled in the art will understand that the secure physical random bit generator in accordance with the present invention has the above and other advantages over the prior art. The present invention is reasonably efficient in terms of bits generated per second, is economical and convenient to use because it does not require hardware or system alterations or user involvement beyond that commonly available in computer systems. The present invention is designed for use with the "average computer" by the "average user", and allows the user the ability to determine easily whether or not the random generator is operating properly.

In order to establish consistent randomness of the bits, a random generator in accordance with the principles of the present invention is based on well-studied phenomena which exhibits at least some chaotic behavior (e.g., in a paranoid mode), and is, therefore, unpredictable.

When it is acceptable to base the unpredictability of a random generator on phenomena having weaker guarantees of randomness, a utility mode can be utilized. In the utility mode, it suffices that the phenomena have been well-studied, and that generally accepted bounds exist on the ability to predict the parameters of the phenomena from which the random bits are derived.

Although the present embodiments were described with respect to the random timings of a computer disk drive and other events of a sporadic or periodic nature in a computer system, a person of skill in the art will appreciate and understand that other computer storage devices, not limited to the storage devices listed above, are also usable to form the basis for a secure physical random bit generator apparatus and method in accordance with the principles of the present invention.

While the invention has been described with reference to the exemplary embodiments thereof, those skilled in the art will be able to make various modifications to the described embodiments of the invention without departing from the true spirit and scope of the invention.

What is claimed is:

1. An apparatus to generate random bits, comprising:
   a storage device, said storage device having a latency associated with a process of accessing information therefrom, said latency causing said process of accessing information to have an entropy; and
   an extractor for extracting random bits derived from said entropy of said latency of said storage device;
   wherein said extractor is calibrated to determine a randomness available from said storage device.

2. The apparatus to generate random bits according to claim 1, further comprising:
   a computer system;
   said storage device being adapted to operate within said computer system.

3. The apparatus to generate random bits according to claim 1, wherein:
   said storage device is a rotating storage device; and
   said latency is a rotational latency.

4. The apparatus to generate random bits according to claim 1, wherein:
   said extractor is adapted to repeatedly measure access times for predetermined storage device addresses, and to extract random bits from said measurements.

5. The apparatus to generate random bits according to claim 4, wherein:
   said access time for each predetermined storage device address contains the time required for nearly a full disk rotation.

6. The apparatus to generate random bits according to claim 4, wherein:
   said extractor is further adapted to determine an appropriate sequence of storage device addresses to access, to measure an amount of available entropy of said latency of said storage device, and to calculate a minimum measurement needed per random bit output to meet a predetermined error rate given said available entropy.

7. The apparatus to generate random bits according to claim 1, wherein:
   said extractor is adapted to measure a response time for certain I/O requests, and to extract random bits from said measurements.

8. The apparatus to generate random bits from a storage device according to claim 1, wherein:
   said storage device is a hard disk drive.

9. An apparatus to generate random bits from a storage device, comprising:
   a storage device adapted to be responsive at random rates to access requests; and
   an extractor to extract random bits derived from a variance in a response time of said storage device;
   wherein said extractor is calibrated to determine a randomness available from said storage device.

10. The apparatus to generate random bits from a storage device according to claim 9, wherein:
    said storage device operates within a computer system.

11. The apparatus to generate random bits from a storage device according to claim 9, further comprising:
    a computer system including hardware components and software components communicating with said storage device in an input/output (I/O) circuit path.

12. The apparatus to generate random bits from a storage device according to claim 11, wherein:
    said storage device is a hard disk drive.

13. The apparatus to generate random bits from a storage device according to claim 11, wherein:
    said storage device has a rotational latency, said rotational latency having an entropy.

14. The apparatus to generate random bits from a storage device according to claim 13, wherein:
    said entropy of said rotational latency arises from air turbulence.

15. The apparatus to generate random bits from a storage device according to claim 9, wherein:
    said extractor is adapted to repeatedly measure access times for predetermined storage device addresses, and to extract random bits from said measurements.

16. The apparatus to generate random bits from a storage device according to claim 15, wherein:
    said access time for each predetermined storage device address contains the time required for a full disk rotation.

17. The apparatus to generate random bits from a storage device according to claim 9, wherein:
    said extractor is adapted to determine an appropriate sequence of storage device addresses to access, to measure an amount of available entropy of said storage device, and to calculate a minimum measurement needed per random bit output to meet a predetermined error rate given said available entropy.

18. The apparatus to generate random bits from a storage device according to claim 9, wherein:
    said extractor is adapted to measure a response time for certain I/O requests and to extract random bits from said measurements.

19. A method for deriving random bits from a storage device, said method comprising:
    providing an operating storage device;
    measuring a time required by said storage device to respond to a access request;

calibrating an amount of randomness available from said storage device; and deriving a random bit output from said measured time.

20. The method for deriving random bits from a storage device according to claim 19, wherein:

said storage device is a disk drive.

21. The method for deriving random bits from a storage device according to claim 20, wherein said storage device comprises:

at least one disk; and at least one head for accessing information to and from said at least one disk.

22. The method for deriving random bits from a storage device according to claim 21, further comprising:

accessing first address information on a first track of said at least one disk;

accessing second address information on a second track of said at least one disk;

determining a location of said second address information relative to said at least one head;

calculating a time between said accessing first address information and said accessing second address information; and deriving a random bit output based on a multiplicity of such said calculated times.

23. The method for deriving random bits from a storage device according to claim 19, further comprising:

measuring a response time for certain I/O circuit path requests; and deriving a random bit output from a multiplicity of such said measured response times.

24. The method for deriving random bits from a storage device according to claim 19, further comprising:

determining an appropriate sequence of disk addresses to access;

measuring an amount of available entropy; and calculating how many measurements are needed per output bit to meet a predetermined error rate based on said amount of available entropy.

25. The method for deriving random bits from a storage device according to claim 24, further comprising:

measuring access times for said determined disk addresses; and extracting random bits from said measured access times.

26. An apparatus to generate random bits, comprising:

a storage device, said storage device having a latency associated with a process of accessing information therefrom, said latency causing said process of accessing information to have an entropy; and an extractor for extracting random bits derived from said entropy of said latency of said storage device, said extractor being calibrated to determine a randomness available from said storage device;

wherein said extractor queries said storage device, and where a large number of read operations are used in measuring raw service times of said storage device from which random bits are derived.

27. An apparatus to generate random bits, comprising:

a storage device, said storage device having a latency associated with a process of accessing information therefrom, said latency causing said process of accessing information to have an entropy; and an extractor for extracting random bits derived from said entropy of said latency of said storage device, said extractor being calibrated to determine a randomness available from said storage device;

wherein said extractor applies a filtering function to a sequence of raw service times of said storage device from which a sequence of random bits for output are derived.

* * * * *